US009204421B2

United States Patent
Harris et al.

(10) Patent No.: US 9,204,421 B2
(45) Date of Patent: *Dec. 1, 2015

(54) APPLICATION CONFIGURED TRIGGERS AND PUSH NOTIFICATIONS OF NETWORK INFORMATION

(71) Applicant: NOKIA SIEMENS NETWORKS OY, Espoo (FI)

(72) Inventors: John Harris, Glenview, IL (US); Ronald Crocker, St. Charles, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,046

(22) Filed: May 17, 2013

(65) Prior Publication Data

US 2014/0342705 A1    Nov. 20, 2014

(51) Int. Cl.
*H04M 3/42* (2006.01)
*H04W 68/00* (2009.01)
*H04L 29/08* (2006.01)
*H04W 4/02* (2009.01)
*H04W 4/20* (2009.01)

(52) U.S. Cl.
CPC ............ *H04W 68/005* (2013.01); *H04L 67/26* (2013.01); *H04W 4/02* (2013.01); *H04W 4/206* (2013.01)

(58) Field of Classification Search
CPC ...... H04L 67/26; H04W 4/12; H04W 68/005; H04W 8/22
USPC ...................... 455/412.2, 418, 466
See application file for complete search history.

(56) References Cited

U.S. PATENT DOCUMENTS

| | | | |
|---|---|---|---|
| 6,021,122 A | 2/2000 | Tiedemann, Jr. | |
| 2005/0071476 A1 | 3/2005 | Tejaswini et al. | |
| 2007/0169001 A1 | 7/2007 | Raghunath et al. | |
| 2008/0159232 A1 | 7/2008 | Thalanany et al. | |
| 2008/0244040 A1 | 10/2008 | Bhatia et al. | |
| 2009/0086643 A1 | 4/2009 | Kotrla et al. | |
| 2010/0316066 A1 | 12/2010 | Leung | |
| 2011/0274156 A1 | 11/2011 | Mighani et al. | |
| 2012/0170451 A1 | 7/2012 | Viswanathan et al. | |
| 2012/0173901 A1* | 7/2012 | Soliman et al. | 713/320 |
| 2012/0315879 A1* | 12/2012 | Vrbaski et al. | 455/412.1 |
| 2013/0005391 A1* | 1/2013 | Niass et al. | 455/525 |

FOREIGN PATENT DOCUMENTS

EP     1 853 045 A1    11/2007

OTHER PUBLICATIONS

International Search Report and Written Opinion dated May 13, 2014, issued in corresponding PCT/EP2014/056778, 11 pages.
Non-Final Office Action dated Dec. 18, 2014, issued in related U.S. Appl. No. 14/054,287, 16 pages.
International Search Report application No. PCT/EP2014/069760 dated Apr. 29, 2015.

* cited by examiner

*Primary Examiner* — Babar Sarwar
(74) *Attorney, Agent, or Firm* — Squire Patton Boggs (US) LLP

(57) ABSTRACT

Various communication systems may benefit from push notifications of network information. For example, cellular optimization may be accomplished by selective use of a web technique by applications on network devices, which may further benefit from push notifications that may reduce the need for web requests. According to certain embodiments, a method can include monitoring network service viability for a user or application. The method can also include sending a push message to a user equipment when network service viability is detected for the user or the application.

19 Claims, 7 Drawing Sheets

APPLICATION CONFIGURED TRIGGERS AND PUSH NOTIFICATIONS OF NETWORK INFORMATION

BACKGROUND

1. Field

Various communication systems may benefit from push notifications of network information. For example, cellular optimization may be accomplished by selective use of a web technique by applications on network devices, which may further benefit from push notifications that may reduce the need for web requests.

2. Description of the Related Art

A media optimizer in the core network cannot cause certain streaming applications to perform certain adaptations that are solely controlled by the application in the client. This may be true, for example, for adaptation of whether to prefill or only download video just in time where within these protocols the next section of video can only be downloaded when the user equipment (UE) App/application sends a requested uniform resource locator (URL) corresponding to the next section of video. A browsing gateway is one example of a media optimizer. Some media optimizers may sit outside of the evolved packet core (EPC). These approaches may require that the UE have knowledge of radio access network conditions or core network traffic conditions, and these conditions may vary over time.

In current wireless communication systems, wireless network utilization may be, on average, only about 30% during a busy time, meaning that the network is 70% idle. With authorized shared access (ASA) and continuing bursty user traffic patterns, this large amount of idle resources may be targeted for use by various applications.

Wireless traffic of particular interest may be traffic with requirements for high bit rates, low latency, high consistency of coverage, and/or low network utilization for purposes such as prefetching. However, wireless resources may be increasingly intermittent, for example, due to ASA, small cells, real-time video, and very high bit rate services at the edge of loaded cells.

Techniques for identifying coverage holes exist. Additional capacity/coverage can be added, for example, through additional small cells, and in some cases remote electrical tilt of antennas. However, higher bit rate applications may not always be able to function well across the entire wireless system.

A knowledge server architecture may be provided to answer queries regarding network conditions. For example, with a knowledge server architecture, applications may be able to use a uniform resource locator (URL) to query the knowledge server. In response, the knowledge server can provide network insights, involving, for example, whether now is a good time to perform prefetching, for example due to low network utilization or loading and/or likely network limitations.

However, there may be a waste of radio frequency (RF) resources when applications (Apps) are slow to discover newly available resources. On the other hand, it may waste both RF resources and UE battery if an App repeatedly tests or queries a network or server regarding network conditions. Similarly, it may waste a user's time for the user to tap on an application and then wait to see if it will work. Additionally, when an application is slow to discover changed network conditions, then the application may continue with behavior which is no longer appropriate. Examples might include continuing toward an area of a coverage hole, or continuing to prefetch.

Lack of coverage or lack of adequate cellular over the air performance may be an element of customer experience concerns, and customer experience management (CEM). From a consumer perspective, the consumer over an interval of time will typically learn that, in particular locations, calls will consistently drop. For example, for a particular user such locations might include a particular portion of one route to the cafeteria or between home and work. Consequently, this typical user may simply avoid placing calls in these areas, and may endeavor to complete calls prior to entering these areas. Improving wireless coverage/eliminating coverage holes within cellular systems can be a resource intensive process for the operator. For example, one expensive example would be where the operator has deployed an additional small cell.

When the customer service provider or wireless infrastructure provider rectifies a coverage hole, it may do so in order to improve customer experience and/or customer satisfaction. However, for existing customers that are already consistently or habitually avoiding real-time wireless usage in these regions, the customer experience improvement may be greatly diminished or altogether avoided.

SUMMARY

According to certain embodiments, a method can include monitoring network service viability for a user or application. The method can also include sending a push message to a user equipment when network service viability is detected for the user or the application.

In certain embodiments, a method can include sending, from a user equipment, a query to monitor network service viability for a user application. The method can also include receiving a push notification based on the monitoring.

A method, according to certain embodiments, can include detecting, at a user equipment, a need to monitor network service viability for an application of the user equipment. The method can also include monitoring network service viability based on the detecting. The method can further include notifying a user of the user equipment when network service viability improves beyond a predetermined threshold.

An apparatus, in certain embodiments, can include at least one processor and at least one memory including computer program code. The at least one memory and the computer program code can be configured to, with the at least one processor, cause the apparatus at least to monitor network service viability for a user or application. The at least one memory and the computer program code can also be configured to, with the at least one processor, cause the apparatus at least to send a push message to an application running on a user equipment when network service viability is detected for the user or the application.

According to certain embodiments, an apparatus can include at least one processor and at least one memory including computer program code. The at least one memory and the computer program code can be configured to, with the at least one processor, cause the apparatus at least to sending, from a user equipment, a query to monitor network service viability for a user application. The at least one memory and the computer program code can also be configured to, with the at least one processor, cause the apparatus at least to receive a push notification based on the monitoring.

In certain embodiments, an apparatus can include at least one processor and at least one memory including computer program code. The at least one memory and the computer program code can be configured to, with the at least one processor, cause the apparatus at least to detect, at a user equipment, a need to monitor network service viability for an application of the user equipment. The at least one memory and the computer program code can also be configured to, with the at least one processor, cause the apparatus at least to monitor network service viability based on the detecting. The at least one memory and the computer program code can further be configured to, with the at least one processor, cause the apparatus at least to notify a user of the user equipment when network service viability improves beyond a predetermined threshold.

According to certain embodiments, an apparatus can include means for monitoring network service viability for a user or application. The apparatus can also include means for sending a push message to a user equipment when network service viability is detected for the user or the application.

In certain embodiments, an apparatus can include means for sending, from a user equipment, a query to monitor network service viability for a user application. The apparatus can also include means for receiving a push notification based on the monitoring.

An apparatus, according to certain embodiments, can include means for detecting, at a user equipment, a need to monitor network service viability for an application of the user equipment. The apparatus can also include means for monitoring network service viability based on the detecting. The apparatus can further include means for notifying a user of the user equipment when network service viability improves beyond a predetermined threshold.

A non-transitory computer-readable medium can, in certain embodiments, be encoded with instructions that, when executed in hardware, perform a process. The process can include monitoring network service viability for a user or application. The process can also include sending a push message to a user equipment when network service viability is detected for the user or the application.

A non-transitory computer-readable medium can, according to certain embodiments, be encoded with instructions that, when executed in hardware, perform a process. The process can include sending, from a user equipment, a query to monitor network service viability for a user application. The process can also include receiving a push notification based on the monitoring.

In certain embodiments, a non-transitory computer-readable medium can be encoded with instructions that, when executed in hardware, perform a process. The process can include detecting, at a user equipment, a need to monitor network service viability for an application of the user equipment. The process can also include monitoring network service viability based on the detecting. The process can further include notifying a user of the user equipment when network service viability improves beyond a predetermined threshold.

BRIEF DESCRIPTION OF THE DRAWINGS

For proper understanding of the invention, reference should be made to the accompanying drawings, wherein.

DETAILED DESCRIPTION

Figure 1:
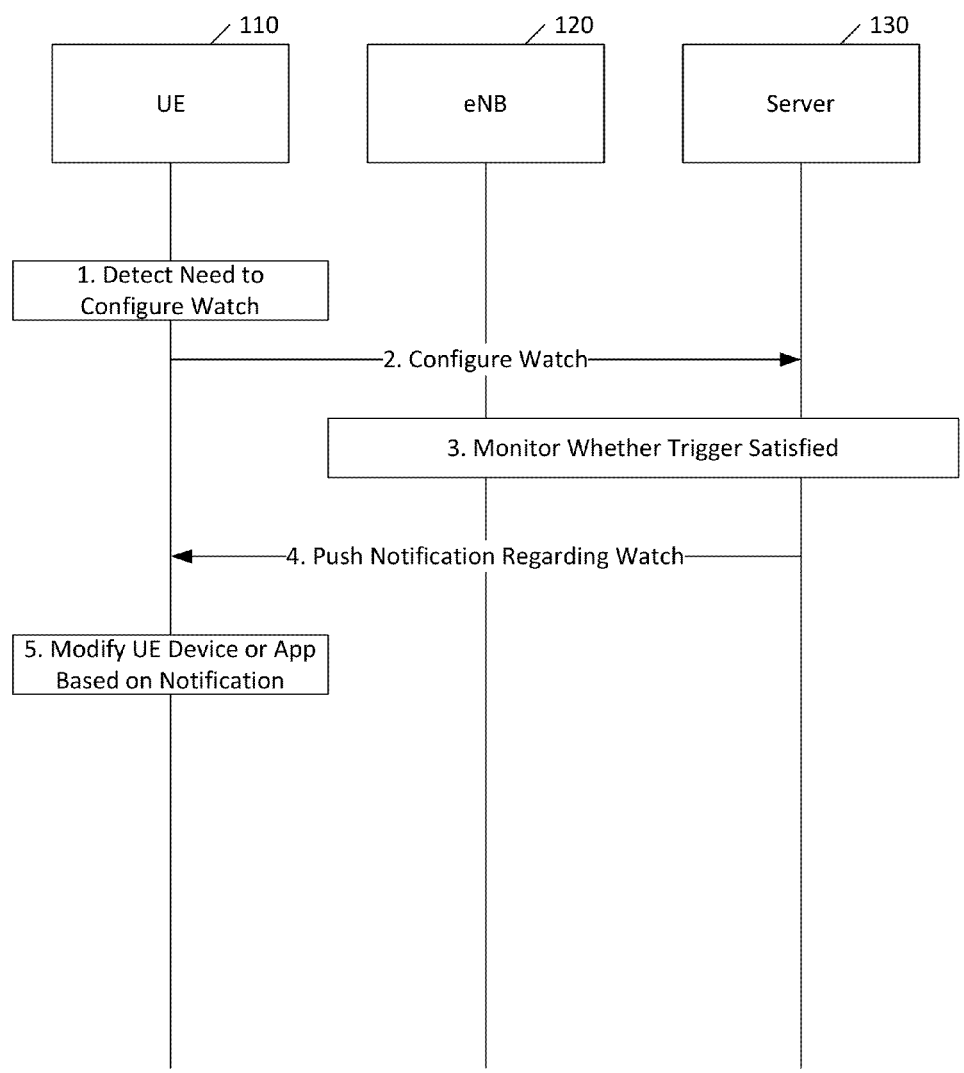
FIG. 1 illustrates a signal flow diagram for a method according to certain embodiments.

Certain embodiments discussed herein may relate to providing a knowledge server (KS) push notification service which may allow a user equipment (UE) subscribe to a KS push notification service for an application level push notification when the wireless conditions reach a particular state. This state or trigger may be one that is immediately relevant to the particular UE's application. For example, the particular UE application may now be in conditions that are appropriate for some particular behavior. This notification can then trigger applications, which had been waiting for idle wireless resources to perform certain reactions.

These reaction use cases may include background prefetching and/or advertising certain high bit rate services to the application (App) and/or user. Additionally, on smart phones this pushed radio frequency (RF) condition update notification may result in a modification of an icon or badge for certain apps/contacts to indicate that those apps/contacts are now "viable."

This push notification service may enable a significant reduction in the amount of battery drain and wireless resources consumed performing possibly periodic knowledge server URL queries, in cases where the knowledge server response may be the same as it was the last time it was queried by the device.

More generally, certain embodiments provide a mechanism to accelerate applications discovering otherwise wasted resources, so that they can strategically use the resources, in order to work around network limitations/congestion. Likewise, certain embodiments provide a mechanism to accelerate applications in discovering that there are sufficient network resources for their high bit rate application, for example, streaming movies, video telephony, prefetching, or the like.

Such demanding applications may have both demands of a wireless system, in terms of high bit rate, radio coverage, and consistency conditions. They may also have requirements such as that the application server is functioning and not overloaded.

There may be cases where additional wireless resources become available, where they were not previously available. In cases where additional wireless resources are now available, but are not being fully used, certain embodiments may provide a way to improve both resource usage and customer experience.

Such an opportunity may present itself after deployment of a small cell, after authorized shared access returns additional spectrum to the communication service providers (CSP), or after other heavy user loading dissipates. Certain embodiments may promote usage and/or awareness as quickly and strategically as possible, when such additional idle and/or unused wireless resources become available and idle. Thus, certain embodiments may not directly address coverage holes themselves, but rather may address rapidly exploiting newly available RF resources, such as those existing in previous coverage holes.

Certain embodiments may significantly magnify or increase the amount of improved customer experience that the operator will provide after having addressed a coverage hole, such as after investing in an additional small cell or other cellular resources to fix a known coverage hole. Furthermore, notifications of this type may be provided as a premium service. For example, such notifications can be provided for premium users identified through customer experience management, or for users which are paying an incremental amount for such wireless experience enhancements. In another embodiment, such messages can be sent to users who have complained about call or video quality in the same geographic region as the improvement. In a further embodiment, such messages can be sent to users who previously queried a knowledge server regarding radio characteristics in a particular area.

Additionally, these notifications may be further prioritized in order to avoid attempting simultaneous notification of numerous UEs in the same region. Thus, a time window can be defined, such as a one second window, a five second window, or a one minute window (other lengths of time are also permitted), and only a highest priority notification can be sent within a given window. Alternatively, only a limited number, for example five, notifications may be sent within a given time window. Whether the notifications are limited may depend on whether the notifications are to be displayed to the user or not. For example, for notifications that are expected to be used automatically by an application, the time window may be more narrowly defined and more restrictive, whereas notifications that are expected to be viewed by the user may be more broadly defined and less restrictive.

Furthermore, these notifications may be prioritized according to a schedule of time intervals and/or locations which was/were configured in the watch. For example, it may be that a notification is most important and/or impactful to the application just before it makes specific decisions. One example is with video where the compression level for the next segment of video may be determined once per segment or once every 10 seconds. In this case the application of the handset may configure the watch to include the knowledge of these specific time intervals where the notification could be particularly impactful. In another embodiment, where the user is selecting a route based on these notifications, it may be that when the user approaches specific intersections where one of two different routes can be selected and there has been a change, then a notification of the change in the wireless conditions along one or the other route is particularly impactful. Consequently, the application enhancer may have configured specific geographic locations in the watch, indicating that if there is a notification corresponding to that watch, and the user enters that particular location, then that notification should be given higher priority. Such a situation may arise when the user is in other locations, for example has just selected one route or the other after passing the aforementioned intersection/location.

Moreover, certain embodiments may avoid providing an alert or messaging users, except where the information is most likely to be useful or important to the subscriber. Thus, the mechanism described herein is not simply that the UE alerts a user or application(s) any time the UE reenters coverage. Similarly, certain embodiments are not directed to push notifications of services, such as connectivity services offered by hotspot and other local area wireless access points.

Thus, certain embodiments may provide a technique for increasing the amount of customer experience improvement realized resulting from an improvement in coverage in a geographic region with previously established history of poor coverage/service for that user. Moreover, certain embodiments relate to a technique for increasing customer experience improvement in which a first network element, for example a customer experience management (CEM) entity can perform a process. The process can include the network creating a network service viability watch for at least a first user and/or application (App). The process can also include performing messaging to monitor the user's wireless service viability conditions. Upon detection that network service viability watch for the user has been satisfied, the network can initiate an application level push notification to the corresponding App/user.

The push notification can trigger at least one of the application beginning to transfer background traffic or modification of a badge, a smart phone App icon, or a contact Icon An App on the user's device can create the service viability watch. Alternatively, the network can create a watch. For example, if a user pattern matches predetermined criteria, a watch can be created.

The watch can include radio conditions such as required bit rate, delay, utilization, or the like. The watch can also include specific locations. Moreover, the watch can focus on radio conditions for specific locations on a location-by-location basis.

The network element can inform the wireless network of currently pending service viability watches. In consequence, the wireless network can perform stricter admission control. For example, the stricter admission control can be in response to detection of more than a threshold amount of additional, for example high value, watches being established. In another embodiment, the network may preferentially cause the user with a configured watch to remain in a relatively connected state such that the network can more accurately monitor the users RF conditions, for the purpose of better monitoring the configured network condition watch. This embodiment may be more relevant for the case where the user is not performing application traffic during the time interval covered by the watch.

The messaging to monitor the user's wireless conditions can be messaging to the wireless network element, such as unicast messaging. Alternatively, or in addition, the messaging can include messaging to a group of other wireless users currently using the wireless network.

The network element can be a CEM server, a knowledge server, or a push notification server. The network element can continuously monitor the user's area radio conditions. For example, the monitoring can be based on radio frequency (RF) messaging such as radio resource control (RRC) messaging, handoff and/or handover messaging, tracking area updates (TAUS), location area updates (LAUs), reporting area updates (RAUs), and radio quality reports, such as channel quality indicator (CQI), reference signal received quality (RSRQ), reference signal received power (RSRP), or other measurement report messaging. The monitoring can also include operations and maintenance (O&M) messaging from an evolved Node B (eNB) corresponding to an area of interest, such as the area that the user equipment (UE) currently resides.

In order to determine when to autonomously trigger the described push notifications upon reaching the configured watch criteria, various criteria can be used. For example, the network or device or App on the device can automatically create a service viability watch upon detection of an event.

The event may be, for example, that the UE has traversed a particular geographic region more than a threshold amount. Such a criterion may imply that the user is a commuter who may be self-trained not to place calls in the geographic region, based on prior lack of success in placing calls in that region. In other words, the user may be aware from the user's own experience or from reports from other users that there were coverage holes in a particular region. The criteria may, therefore, include that the particular UE has not successfully placed any calls, or other real time communications such as video chat, within this geographic region.

Additionally, the UE may configure multiple simultaneous watches. In such cases, the notification may include an index indicating which watch has been satisfied, for example for the case where the application is considering two different possible navigational routes. Furthermore, in another embodiment, the watch may be configured to monitor for the relative network conditions between two different locations or navigational routes. For example, the watch may be configured to perform notification if the relative goodness of the network conditions on one route relative to the other route changes more than a threshold amount.

Furthermore, the App's configuration of the watch may further indicate/place requirements on the time interval associated with the watch, such as how long or consistent the network conditions are expected to be. After coverage improvement has occurred, a push message can be sent to the user equipment to inform the user of the improved radio conditions in the area, for example, subsequent to the coverage improvement. Alternatively, the push notification may inform the user or user equipment of an expected duration of coverage difficulty in a particular area, to set a user's expectations regarding a horizon for the coverage hole.

Another event that can lead to the creation of a watch is a UE/App initiated service. For example, the event can be that the UE/App initiated service failed, for example due to a network or App server error. The watch may also take into account the location of the event and/or a threshold time interval of how recent the event is. For example, several failures within a short time interval may trigger the watch. The event can be detected in terms of an upcoming context, such as location, time of day, time of week, or the like. Moreover, the push message can be timed to correspond to the timing or location of the event. For example, if the user experienced trouble during a morning commuting time, the push message can be sent during a morning commuting time. Similarly, if the user experienced trouble at a train station, the push message can be sent the next time the user is at the same train station. Furthermore, the watch configured may correspond to a series of locations, where each location is associated with a subsequent future time interval, such that the watch is configured to correspond to the user's planned primary or alternate navigational route.

Another event that can lead to the creation of a watch is detection that in a particular geographic region there has been a significant increase in coverage/wireless service quality. For example, the network element may detect that in this first geographic region coverage was previously consistently worse than a threshold, but is now consistently better than the threshold.

A network element can trigger knowledge server (KS) push messaging to the UE/subscriber upon detection of the service viability watch being satisfied. Messaging to the user can be automatically avoided if network detects successful calls with that user within the first geographic region, wherein calls were previously consistently unsuccessful in that first geographic region. In other words, the sending of the push messaging can be conditioned on the network determining that the push message would be informative to the user. If the user already knows that there is coverage, then, there is no need to send the message.

For example, in a particular embodiment, a server can detect that in a first geographic region a significant increase in coverage/wireless service quality has been achieved. Moreover, the server can detect that in this first geographic region, coverage was previously consistently worse than a threshold.

Moreover, the server can identify at least one UE that satisfies the following conditions. For example, the conditions can include that the UE has traversed this first geographic region more than a threshold amount. Thus, the user of the UE may be a commuter who has potentially self-trained not to place calls or engage in other real-time communication in this geographic region. The conditions can also include that the UE has not placed any calls, or other real time communications, within this first geographic region. In other words, the UE has not successfully done so, and/or has not done so subsequent to the coverage improvement. In response to a network element detecting such a UE, the network element can trigger messaging to the UE/subscriber indicating that there is newly enhanced/expanded network coverage/quality in this first geographic area.

Messaging can be restricted in various ways. For example, the messaging can be restricted to subscribers that previously passed through a particular geographic region more than a threshold amount, prior to the coverage improvement. Alternatively, or in addition, the messaging can be restricted to subscribers that typically place more than a threshold amount of calls/real-time communications, implying that the omission of any calls in this area a likely indicator of the relevance of such messaging to the subscriber.

Another option is that messaging can be restricted to subscribers that terminate calls just prior to entering the first geographic region. Such action may imply that the subscriber was hurrying to terminate the call just prior to entering the first geographic region, which now has new coverage. For example, a tunnel may previously have had no coverage, but may now have coverage. In such a circumstance, users may terminate calls because of fear of losing the call in the tunnel. However, if users were aware of continued coverage in the tunnel, they could maintain their calls or place new calls while in the tunnel.

In another option, messaging can be restricted to subscribers that initiate calls just after exiting the first geographic region. Such behavior may imply that the subscribers were waiting until they exited the first geographic region before placing calls. Likewise, in an option, messaging can be restricted to subscribers that consistently navigate around an area of poor wireless coverage area. In particular, it may be considered whether they do so while engaged in calls/real-time wireless communication, instead of choosing a path through the first geographic region, which would appear to provide a shorter/more direct route. For example, historical data regarding the subscribers may be considered to determine whether their paths selected more likely depend on their need for coverage. Such subscribers may then receive messaging regarding an area of improved coverage.

Notifications of this type may be provided as a premium service. For example, such notifications may be sent only to premium users identified through customer experience management, or for users which are paying an incremental amount for such wireless experience enhancements.

Detecting the improvement in coverage in a first geographic region can be done in a variety of ways. For example, a communication element within the wireless infrastructure, such as an evolved Node B, can perform the detection. Alternatively, or in addition, an application running on the UE or subscriber device can perform the detection. In another option, an application running on the Internet can perform the detection, even if the application is on a remote server.

A notification can be triggered when a network element detects successful calls within a first geographic region, wherein calls were previously consistently unsuccessful in that first geographic region. The network element can incorporate information from an operations and maintenance (O&M) system. Such information can include, for example, that an additional cell was deployed covering the geographic region. The information can further be based on input from a remote electrical tilt (RET) system indicating that a remote electrical antenna tilt was performed. Such a new tilt may provided coverage in the geographic region, which was previously consistently absent.

The method described herein can be implemented within a network customer experience management system. The messaging, in such a case, may be achieved, for example over text messages to the user.

Alternatively, a UE application can detects the pattern(s) as described above and then can directly perform messaging to the subscriber. This may, for example, be part of an application downloaded onto a smart phone or part of an operating system of the UE.

An application and/or service provider, such a mapping and directions service, can provide a service by detecting the change and then performing the notification. Moreover, the mapping service can provide notifications both of areas where currently many calls are being terminated, and areas where such conditions formerly existed but no longer existed. Thus, for example, if a mapping service monitors user behavior in correlation to geography, the mapping service may be aware of coverage holes and may likewise be able to detect when a previous coverage hole is no longer present.

FIG. 1 illustrates a signal flow diagram for a method according to certain embodiments. As shown in FIG. 1, at 1 a user equipment 110 can detect a need to configure a watch. The need can be, for example, based on the user considering taking a different route to work. For example, an application could create a watch, resulting in a push notification if network traffic congestion reduces on some alternate vehicle route which is shorter but previously had worse coverage.

At 2, the user equipment or an application thereof can configure a watch by sending a message to eNB 120 and/or server 130. Then, at 3, the server 130 and/or the eNB 120 can monitor to determine whether a trigger for the watch is satisfied. The server 130 here can be a knowledge server. The trigger maybe satisfied, for example, due to a change in cell loading along a predetermined route.

When the trigger is met, at 4, the server 130 and/or the eNB 120 can send a push notification to user equipment 110. An application on user equipment 110 can then create an alert or a change of a badge or icon on the user equipment 110, to alert the user regarding the changed conditions. In another embodiment, an application on user equipment 110 application may close the session associated with an ongoing file transfer in order to reduce the amount of loading on the cellular network, for example causing a TCP FIN message to be transmitted to the application server, causing the in progress file download to stop. This may serve to reduce the amount of overshoot where application traffic continues after network utilization increases.

Certain embodiments may provide various benefits or advantages. For example, a significant reduction in the amount of battery drain and wireless resources consumed performing possibly periodic knowledge server URL queries may be obtained. For example, a knowledge server response may frequently be the same as the last time a device queried from a given location. If a user equipment can expect a push notification in case the conditions significantly improve, the user equipment may avoid unnecessarily re-querying.

Figure 2:
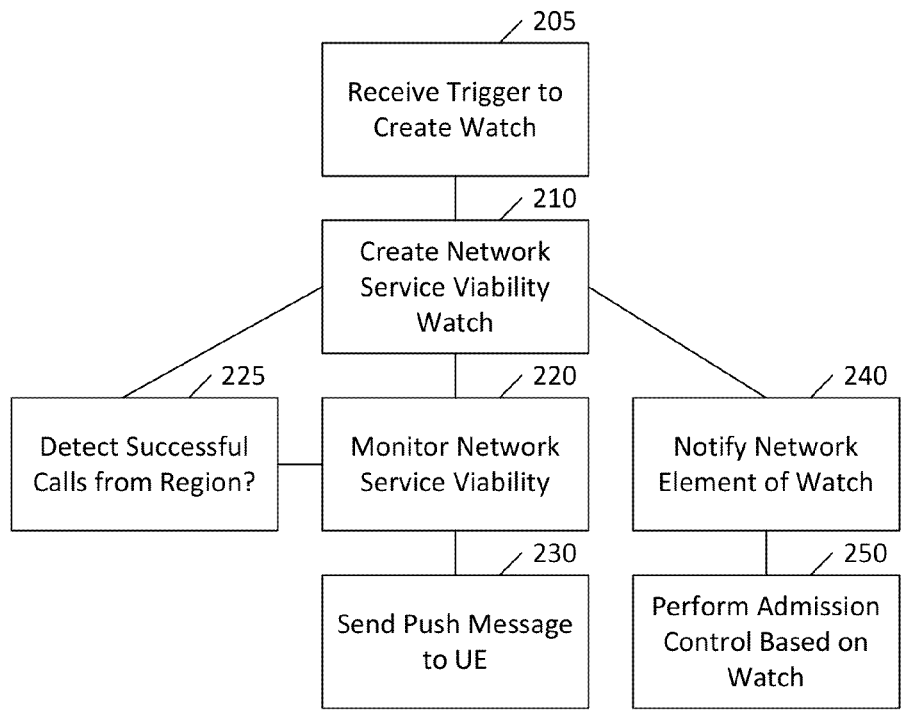
FIG. 2 illustrates a method according to certain embodiments.

FIG. 2 illustrates a method according to certain embodiments. As shown in FIG. 2, a method may include, at 205, receiving some trigger to create a watch. This trigger may be received as a request or query from a user equipment, an application server, or may be self-generated by a network element.

The method may include, at 210, creating a network service viability watch for the user or the application. The creating the network service viability watch can be performed upon detection of at least one event. The event can include at least one of the user equipment traversing a geographic region, a user equipment or application initiating a service (for example, unsuccessfully initiating a service), or a significant increase in coverage or wireless service quality. The event may include that the initiating the service failed due to a network or application server.

The event may, for example, include a user equipment traversing the geographic region more than a threshold number of times. Moreover, the event may include that the user equipment has not placed any calls or real time communications within the geographic region.

The method may also include, at 220, monitoring network service viability for a user or application, for example a user application. The monitoring can be based on the created network service viability watch. The monitoring can include monitoring at least one of required bit rate, delay, utilization, or geographic location. The monitoring can further include monitoring radio conditions in a geographic area corresponding to the user, wherein monitoring the radio conditions includes monitoring at least one of radio resource control messages, handoff messages, handover messages, tracking area updates, channel quality indicator messaging, reference signal received quality messaging, reference signal received power messaging, measurement report messaging, operations and maintenance messaging, or remote electrical tilt messaging. The monitoring can further include the monitoring radio condition impact anticipated, wherein newly initiated call or transfer by another UEs causes an update to the estimated radio conditions and therefore triggers the push notification.

The method may further include, at 230, sending a push message to a user equipment when network service viability is detected for the user or the application. The sending the push message can include sending a unicast message to the user equipment or sending a group message to a group that includes the user equipment. The push message can be an application level push message.

The method can also include, at 240, notifying a network element of an access network of the network service viability watch. The network element, in response, at 250 can impose stricter admission control based on the watch.

The sending the push message may be conditional on not detecting, at 225, successful calls within a first geographic region, wherein calls were previously consistently unsuccessful in that first geographic region.

Service viability notifications can be created through a separate application path than the actual application bearer traffic. In other words service viability notifications can be received from a first server, which does not receive or process any of the traffic associated with the application being influenced by the notifications themselves. This distinction may be further seen in the case where there are two different applications on the handset, and each application separately configures watches with the same network service viability watch system.

Such an approach for notifications may contrast with an approach in which the traffic associated with the user application passes through a midpoint in the network where it is manipulated based on the results of a network monitor. Thus, in such cases application content is delay/queued at a midpoint based on output of a network monitoring element. By contrast, certain embodiments do not require intercepting application traffic at a mid-point. Instead, certain embodiments can selectively push selected network monitoring knowledge directly to the application on the UE. Thus, there may be less need for nuanced App knowledge in the network. Accordingly, in certain embodiments sending a message directly to an application can refer to avoiding any network monitoring midpoint level delay, queueing, or processing of the message, although the message can be relayed through various nodes and may experience typical lower level processing in transit.

Figure 3:
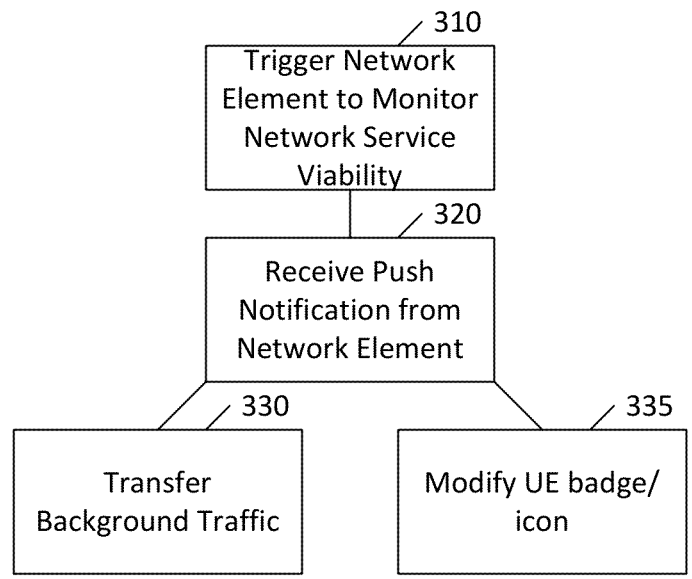
FIG. 3 illustrates another method according to certain embodiments.

FIG. 3 illustrates another method according to certain embodiments. As shown in FIG. 3, a method can include, at 310, triggering a network element to monitor network service viability for a user or application, for example, by sending, from a user equipment, a query to monitor network service viability for a user application. Thus, this triggering can be triggered intentionally by sending a message to a server or access point. For example, the triggering can include creating a service viability watch by the application. Alternatively, the triggering can be done unintentionally, by (for example) repeatedly terminating calls in particular geographic areas, starting calls in particular geographic areas, or forgoing real-time communication in certain geographic areas, or selecting alternate navigational routes. Additionally, triggering may be configured to be performed based upon a combination of network conditions and user traffic mobility estimation, for example related to vehicular traffic congestion.

The method can also include, at 320, receiving a push notification based on the monitoring. In response to the push notification, the method can include performing at least one of, at 330, transferring background traffic by a different/second application, such as an application enhancer, or modifying, at 330, a badge, application icon, or contact icon. The modification can be to the appearance or functionality of the badge or icon. For example, an icon can be locked, and this locked status can be shown by placing a padlock badge over the icon, until the push notification is received. The modifying, therefore, can include locking or unlocking functionality in response to the push notification.

Figure 4:
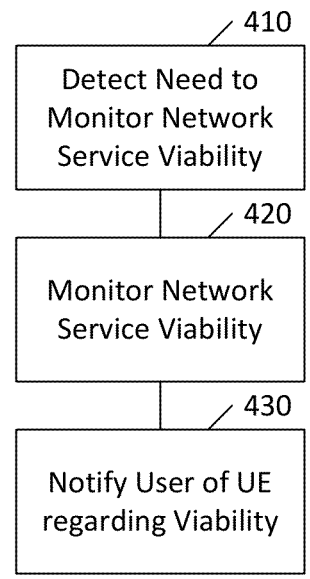
FIG. 4 illustrates a further method according to certain embodiments.

FIG. 4 illustrates a further method according to certain embodiments. As shown in FIG. 4, a method can include, at 410, detecting, at a user equipment, a need to monitor network service viability for an application of the user equipment. The method can also include, at 420, monitoring network service viability based on the detecting. The detecting can include detecting a pattern of connectivity correlated to geographic area and radio conditions. The method can further include, at 430, notifying a user of the user equipment when network service viability improves beyond a predetermined threshold.

Figure 5:
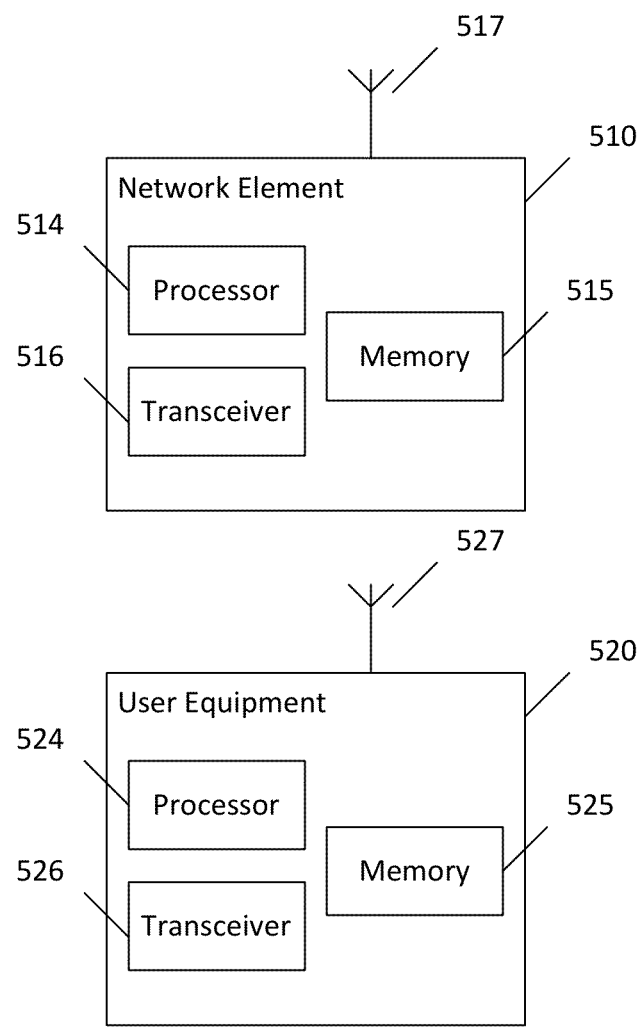
FIG. 5 illustrates a system according to certain embodiments.

FIG. 5 illustrates a system according to certain embodiments of the invention. It should be understood that each block of the flowchart of FIGS. 1-4, 6, and 7 and any combination thereof may be implemented by various means or their combinations, such as hardware, software, firmware, one or more processors and/or circuitry. In one embodiment, a system may comprise several devices, such as, for example, network element 510 and user equipment (UE) or user device 520. The system may comprise more than one UE 520 and more than one network element 510 (as shown in FIG. 1, for example), although only one of each is shown in FIG. 5 for the purposes of illustration. A network element can be an access point, a base station, an eNode B (eNB), a server (for example, a knowledge server) or any of the other network elements discussed herein. Each of these devices may include at least one processor or control unit or module, respectively indicated as 514 and 524. At least one memory may be provided in each device, and indicated as 515 and 525, respectively. The memory may include computer program instructions or computer code contained therein. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna. Likewise, some network elements 510 may be solely configured for wired communication, and such cases antenna 517 may illustrate any form of wired communication hardware, such as a network interface card.

Transceivers 516 and 526 may each, independently, be a transmitter, a receiver, or both a transmitter and a receiver, or a unit or device that may be configured both for transmission and reception. The transmitter and/or receiver may also be implemented as a remote radio head which is not located in the device itself, but in a mast, for example. It should also be appreciated that according to a liquid or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set, for example, procedures, functions, and the like. Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity may be internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIGS. 1-4, 6, and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, or the like, or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 520 may be a cluster member, including either a cluster slave or a cluster master.

Figure 6:
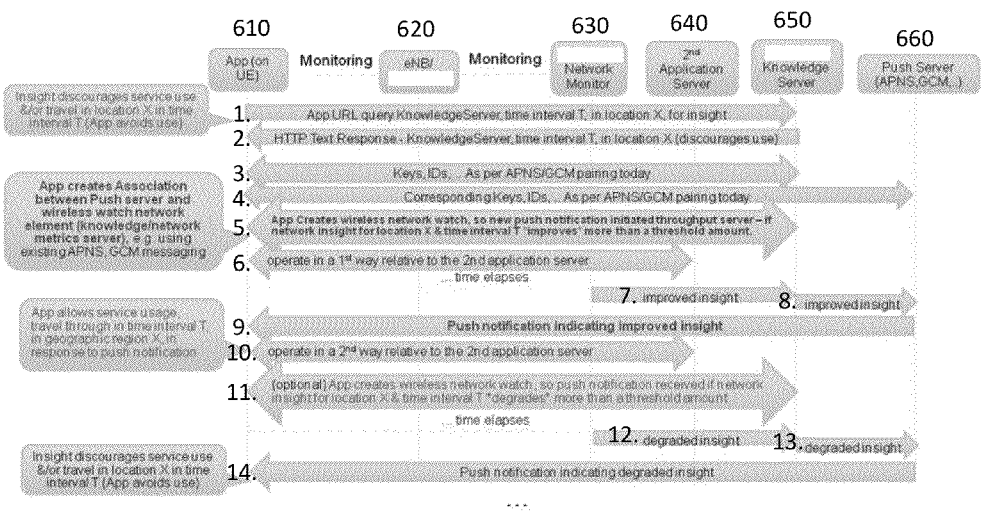
FIG. 6 illustrates a message flow according to certain embodiments.

FIG. 6 illustrates a message flow according to certain embodiments. As shown in FIG. 6, an app on a user equipment 610 may, at 1, send a URL query to a knowledge server 650 by way of eNB 620. The query may specify a timer interval T and/or a location X. At 2, the knowledge server 650 may respond with an HTTP text response, which may discourage use. At 3, there may be a pairing of keys, IDs and so forth between the user equipment 610 and the knowledge server 650. Likewise, at 4, the push server 650 may be similarly informed of the corresponding pairings. At 5, the application on the user equipment 610 can create a wireless network watch with knowledge server 650, such that a new push notification will provided from the network if network insight for location X and/or time interval T improves more than a threshold amount. The user equipment 610 can then, at 6, act in a first way with respect to a second application server 640. Time may elapse and, at 7, a network monitor 630, which may be monitoring the network conditions, for example, by receiving reports from the user equipment 610 and/or the eNB 620, may provide improved insight to the knowledge server 650. In turn, at 8, knowledge server 650 can convey an indication of the improved insight through a push server 650. The push server 650, at 9, can send a push notification indicating or conveying the improved insight. At 10, the application on the user equipment 610 can allow service usage and/or travel in time interval T and/or geographic region X, in response to the push notification. Moreover, the application on the user equipment 610 can begin to operate in a second way relative to second application server 640.

Optionally, at 11, the application on the user equipment 610 can create a wireless network watch with knowledge server 650, such that a new push notification will provided from the network if network insight for location X and/or time interval T degrades more than a threshold amount. Time may elapse and, at 12, a network monitor 630, which may be monitoring the network conditions, for example, by receiving reports from the user equipment 610 and/or the eNB 620, may provide degraded insight to the knowledge server 650. In turn, at 13, knowledge server 650 can provide an indication of the degraded insight to push server 650. The push server 650, at 14, can send a push notification indicating improved insight.

Figure 7:
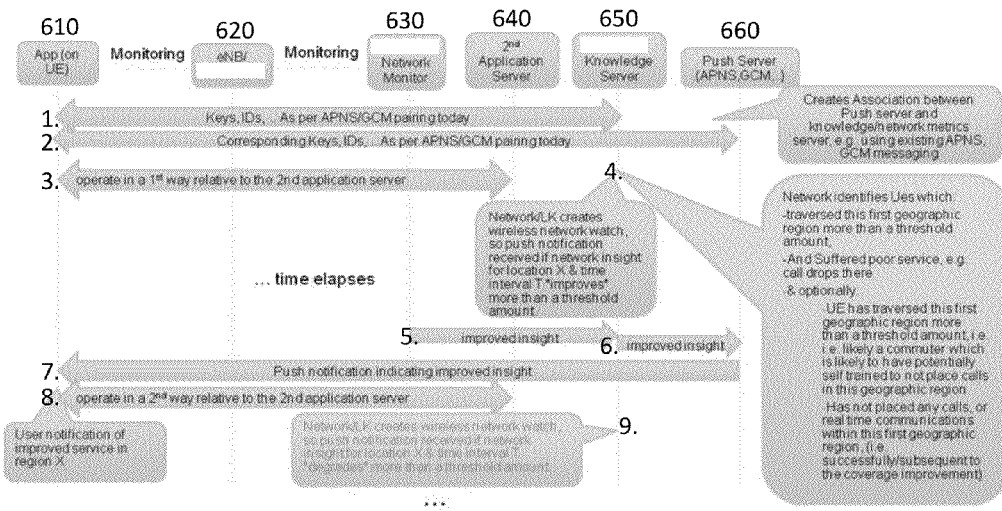
FIG. 7 illustrates another message flow according to certain embodiments.

FIG. 7 illustrates another message flow according to certain embodiments. As shown in FIG. 7, at 1, an application on a user equipment 610 can send keys, IDs, and the like to a knowledge server 650, and at 2 can send corresponding keys, IDs, and so on to a push server 660. This may create an association between the push server and knowledge/network metrics server. At 3, the user equipment 610 may operate in a first way with respect to a second application server 640. Meanwhile, at 4, the network (for example, knowledge server 650) may identify UEs that have traversed a first geographic region more than a threshold amount and suffered poor service, such as call drops, in that first geographic region. Optionally, the knowledge server 650 may take into account other factors, such as how likely the user is to have self-trained not to place calls in the region. Moreover, the knowledge server 650 may take into account whether the user equipment 610 has successfully placed any calls or other real-time communications within the first geographic region, particularly subsequent to any improvements. Also at 4, the knowledge server 650 can create a watch for pushing notification if network conditions improve within time interval T and/or geographic region X.

Time may elapse. When network conditions improve, at 5, a network monitor 630, which may be monitoring the network conditions, for example, by receiving reports from the user equipment 610 and/or the eNB 620, may provide insight of improved network conditions to the knowledge server 650. In turn, at 6, knowledge server 650 can convey an indication of the improved insight through push server 650.

The push server 650, at 7, can send a push notification indicating improved insight. The push server 650 may not be aware of the reason for the push notification or of the contents of the push notification. Thus, the indication may be pushed in a message that is opaque to the push server 650, thereby avoiding any network monitoring midpoint level processing or delay at the push server 650. In other embodiments, the push server 650 may receive an indication that is formulated into a suitable message at the push server 650, but this can be avoided in certain embodiments.

At 8, the application on the user equipment 610 can allow service usage and/or travel in time interval T and/or geographic region X, in response to the push notification. Moreover, the application on the user equipment 610 can begin to operate in a second way relative to second application server 640.

Optionally, at 9, the knowledge server 650 can create a watch for pushing notification if network conditions degrade within time interval T and/or geographic region X.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

ASA Authorized Shared Access
ASIC Application Specific Integrated Circuit
CEM Customer Experience Management CQI Channel Quality Indicator
CPU Central Processing Unit
CSP Communication Service Provider or Customer Service Provider
DSP Digital Signal Processor
eNB evolved Node B
FPGA Field Programmable Gate Array
HDD Hard Disk Drive
KS Knowledge Server
LAU Location Area Update
O&M Operations and Maintenance
PLD Programmable Logic Device
RAM Random Access Memory
RAU Reporting Area Update
RET Remote Electrical Tilt
RF Radio Frequency
RRC Radio Resource Control
RSRQ Reference Signal Received Quality
RSRP Reference Signal Received Power
TAU Tracking Area Update
UE User Equipment
URL Uniform Resource Locator

We claim:

1. A method, comprising:
creating a network service viability watch for a user or application;
monitoring network service viability for the user or the application based on the created network service viability watch; and
sending a push message to a user equipment when the network service viability is detected for the user or the application,
wherein the creating the network service viability watch is performed upon detection of at least one event, wherein the event comprises at least one of the user equipment traversing a geographic region more than a threshold number of times without placing any calls or initiating a real time communication, a user equipment or application initiating a service, or a significant increase in coverage or wireless service quality, and
wherein the creating the network service viability watch is performed based on a request from a user equipment to create the network service viability watch.

2. The method of claim 1, wherein the sending push message comprises sending the message directly from a server that performs the monitoring to an application on the user equipment.

3. The method of claim 1, wherein the sending the push message comprises sending a group message to a group that includes the user equipment.

4. The method of claim 1, further comprising:
notifying a network element of an access network of the network service viability watch.

5. The method of claim 1, wherein the creating the network service viability watch is performed upon detection of at least one event, wherein the event comprises at least one of the user equipment traversing a geographic region, a user equipment or application initiating a service, or a significant increase in coverage or wireless service quality.

6. The method of claim 5, wherein the event comprises the prior initiation the service failing due to a network or application server.

7. The method of claim 1, wherein the sending of the push message is conditional on not detecting successful calls within a first geographic region, wherein calls were previously consistently unsuccessful in that first geographic region.

8. The method of claim 1, wherein the push message comprises an application level push message.

9. The method of claim 1, wherein the monitoring comprises monitoring at least one of required bit rate, delay, network utilization, or geographic location.

10. The method of claim 1, wherein the monitoring comprises monitoring radio conditions in a geographic area corresponding to the user, wherein monitoring the radio conditions comprises monitoring at least one of radio resource control messages, handoff messages, handover messages, tracking area updates, channel quality indicator messaging, reference signal received quality messaging, reference signal received power messaging, measurement report messaging, operations and maintenance messaging, or remote electrical tilt messaging.

11. The method of claim 1, further comprising:
prioritizing the watch with respect to other watches based on at least one of geographic relevance, temporal relevance, or predefined ranking.

12. The method of claim 11, wherein sending the push message is contingent on the watch having a higher prioritization than another watch calling for transmission within a same time window.

13. A method, comprising:
sending, from a user equipment, a query to monitor network service viability for a user or application, wherein the query comprises a request for creation of a network service viability watch for the user or the application and monitoring the network service viability is based on the network service viability watch; and
receiving a push notification based on the monitoring,
wherein creation of the network service viability watch is performed upon detection of at least one event, wherein the event comprises at least one of the user equipment traversing a geographic region more than a threshold number of times without placing any calls or initiating a real time communication, a user equipment or application initiating a service, or a significant increase in coverage or wireless service quality.

14. The method of claim 13, further comprising
in response to the push notification, performing, by the user equipment, at least one of transferring background traffic by the user application or modifying a badge, application icon, or contact icon on the user equipment.

15. A method, comprising:
detecting, at a user equipment, a need to monitor network service viability for an application or user of the user equipment;
creating a network service viability watch for the user or the application based on the detecting;
monitoring network service viability based on the created network service viability watch; and
notifying a user of the user equipment when network service viability improves beyond a predetermined threshold,
wherein the creating the network service viability watch is performed upon detection of at least one event, wherein the event comprises at least one of the user equipment traversing a geographic region more than a threshold number of times without placing any calls or initiating a real time communication, a user equipment or application initiating a service, or a significant increase in coverage or wireless service quality, and
wherein the creating the network service viability watch is performed based on a request from the user equipment to create the network service viability watch.

16. The method of claim 15, wherein the detecting comprises detecting a pattern of connectivity correlated to geographic area and radio conditions.

17. An apparatus, comprising:
at least one processor; and
at least one memory including computer program code,
wherein the at least one memory and the computer program code are configured to, with the at least one processor, cause the apparatus at least to
create a network service viability watch for a user or application;
monitor network service viability for the user or the application based on the created network service viability watch; and
send a push message to a user equipment when network service viability is detected for the user or the application,
wherein the creation of the network service viability watch is performed upon detection of at least one event, wherein the event comprises at least one of the user equipment traversing a geographic region more than a threshold number of times without placing any calls or initiating a real time communication, a user equipment or application initiating a service, or a significant increase in coverage or wireless service quality, and
wherein the creation of the network service viability watch is performed based on a request from a user equipment to create the network service viability watch.

18. An apparatus, comprising:
at least one processor; and
at least one memory including computer program code,
wherein the at least one memory and the computer program code are configured to, with the at least one processor, cause the apparatus at least to
send, from a user equipment, a query to monitor network service viability for a user or application, wherein the query comprises a request for creation of a network service viability watch for the user or the application and monitoring the network service viability is based on the network service viability watch; and
receive a push notification based on the monitoring,
wherein creation of the network service viability watch is performed upon detection of at least one event, wherein the event comprises at least one of the user equipment traversing a geographic region more than a threshold number of times without placing any calls or initiating a real time communication, a user equipment or application initiating a service, or a significant increase in coverage or wireless service quality.

19. An apparatus, comprising:
at least one processor; and
at least one memory including computer program code,
wherein the at least one memory and the computer program code are configured to, with the at least one processor, cause the apparatus at least to
detect, at a user equipment, a need to monitor network service viability for an application or user of the user equipment;
creating a network service viability watch for the user or the application based on the detecting;
monitor network service viability based on the created network service viability watch; and
notify a user of the user equipment when the network service viability improves beyond a predetermined threshold,
wherein the creation of the network service viability watch is performed upon detection of at least one event, wherein the event comprises at least one of the user equipment traversing a geographic region more than a threshold number of times without placing any calls or initiating a real time communication, a user equipment or application initiating a service, or a significant increase in coverage or wireless service quality, and
wherein the creation of the network service viability watch is performed based on a request from the user equipment to create the network service viability watch.

* * * * *